US012658375B2

(12) United States Patent (10) Patent No.: US 12,658,375 B2

Aritomi et al. (45) Date of Patent: Jun. 16, 2026

(54) METHOD FOR MANUFACTURING ELECTRONIC COMPONENT

(71) Applicant: Murata Manufacturing Co., Ltd., Nagaokakyo (JP)

(72) Inventors: Katsutomo Aritomi, Nagaokakyo (JP); Yasuhiko Ueda, Nagaokakyo (JP); Yoshimasa Yoshino, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 356 days.

(21) Appl. No.: 18/361,124

(22) Filed: Jul. 28, 2023

(65) Prior Publication Data

US 2023/0368978 A1 Nov. 16, 2023

Related U.S. Application Data

(63) Continuation of application No. PCT/JP2022/003487, filed on Jan. 31, 2022.

(30) Foreign Application Priority Data

Feb. 2, 2021 (JP) ................................. 2021-014978

(51) Int. Cl.
*H01G 9/00* (2006.01)
*H01G 9/04* (2006.01)
*H01G 9/10* (2006.01)
*H01G 9/15* (2006.01)

(52) U.S. Cl.
CPC ............. *H01G 9/0029* (2013.01); *H01G 9/04* (2013.01); *H01G 9/10* (2013.01); *H01G 9/15* (2013.01)

(58) Field of Classification Search
CPC .......... H01G 9/0029; H01G 9/04; H01G 9/10; H01G 9/15
See application file for complete search history.

(56) References Cited

U.S. PATENT DOCUMENTS

| | | | |
|---|---|---|---|
| 9,514,884 B2 | 12/2016 | Lee et al. | |
| 11,295,902 B2 | 4/2022 | Yamazaki et al. | |
| 2002/0001169 A1 | 1/2002 | Shiraishi et al. | |
| 2005/0195558 A1 | 9/2005 | Goldberger et al. | |
| 2010/0165547 A1 | 7/2010 | Kuranuki et al. | |
| 2014/0292141 A1 | 10/2014 | Nishisaka et al. | |
| 2014/0347783 A1 | 11/2014 | Kisumi et al. | |

(Continued)

FOREIGN PATENT DOCUMENTS

| | | |
|---|---|---|
| JP | H06291380 A | 10/1994 |
| JP | 3276113 B1 | 4/2002 |

(Continued)

OTHER PUBLICATIONS

International Search Report in PCT/JP2022/003487, mailed Apr. 26, 2022, 3 pages.

(Continued)

*Primary Examiner* — Scott B Geyer
(74) *Attorney, Agent, or Firm* — ArentFox Schiff LLP

(57) ABSTRACT

A method for manufacturing an electronic component that includes: preparing an electronic component body having an internal electrode, the internal electrode being exposed on an outer surface of the electronic component body; and forming a first electrode layer by injecting fine metal particles to the outer surface of the electronic component body and causing the fine metal particles to collide with the outer surface at a pressure lower than atmospheric pressure.

18 Claims, 4 Drawing Sheets

(56) References Cited

U.S. PATENT DOCUMENTS

| 2015/0136463 | A1 | 5/2015 | Lee et al. |
| 2020/0211784 | A1 | 7/2020 | Tamatani et al. |
| 2020/0266005 | A1 | 8/2020 | Suzuki et al. |
| 2020/0335284 | A1 | 10/2020 | Yamazaki et al. |
| 2021/0383976 | A1 | 12/2021 | Tamatani et al. |

FOREIGN PATENT DOCUMENTS

| JP | 2005-217126 | A | 8/2005 |
| JP | 2007073883 | A | 3/2007 |
| JP | 2007208112 | A | 8/2007 |
| JP | 2009076872 | A | 4/2009 |
| JP | 2011108875 | A | 6/2011 |
| JP | 2011153329 | A | 8/2011 |
| JP | 2014209551 | A | 11/2014 |
| JP | 2015-097248 | A | 5/2015 |
| JP | 2020141059 | A | 9/2020 |
| JP | 2020-178098 | A | 10/2020 |
| JP | 2020194825 | A | 12/2020 |
| WO | 2008081585 | A1 | 7/2008 |
| WO | 2013128957 | A1 | 9/2013 |
| WO | 2014136168 | A1 | 9/2014 |
| WO | 2019065870 | A1 | 4/2019 |
| WO | 2020174847 | A1 | 9/2020 |

OTHER PUBLICATIONS

International Search Report in PCT/JP2022/003492, mailed Mar. 29, 2022, 3 pages.
International Search Report in PCT/JP2022/003495, mailed Mar. 29, 2022, 3 pages.

Cross-sectional view taken along line A–A

METHOD FOR MANUFACTURING ELECTRONIC COMPONENT

CROSS REFERENCE TO RELATED APPLICATIONS

The present application is a continuation of International application No. PCT/JP2022/003487, filed Jan. 31, 2022, which claims priority to Japanese Patent Application No. 2021-014978, filed Feb. 2, 2021, the entire contents of each of which are incorporated herein by reference.

TECHNICAL FIELD

The present disclosure relates to a method for manufacturing an electronic component.

BACKGROUND ART

Patent Literature 1 discloses a chip capacitor.

In Patent Literature 1, a metal film extended along an exposed surface is formed by plating an exposed portion where an internal electrode provided inside a chip substrate is exposed, and then a conductive resin paste is applied to the exposed surface to form a side electrode.

Patent Literature 2 discloses a solid electrolytic capacitor.

Patent Literature 2 discloses that a part of an anode body is exposed on the outside of a sealing body, and the exposed part is covered with a plating layer and electrically connected to a conductive elastic body for an anode through the plating layer.

Patent Literature 1: JP 2007-073883 A
Patent Literature 2: JP 3276113 B

SUMMARY OF INVENTION

In the techniques described in Patent Literatures 1 and 2, the plating process is used as a unit for connecting an internal electrode to an external electrode. In the plating process, immersion in a plating solution is required, but leakage current (LC) failure may occur due to penetration of the plating solution into an unintended location.

Since the plating process is included, there is a problem that the number of steps increases and the manufacturing process becomes complicated.

Therefore, an object of the present disclosure is to provide a method for manufacturing an electronic component, which can suppress the occurrence of LC failure and has a simple manufacturing process.

A method for manufacturing an electronic component of the present disclosure includes: preparing an electronic component body having an internal electrode, the internal electrode being exposed on an outer surface of the electronic component body; and forming a first electrode layer by injecting fine metal particles to the outer surface of the electronic component body and causing the fine metal particles to collide with the outer surface at a pressure lower than atmospheric pressure.

According to the present disclosure, it is possible to provide a method for manufacturing an electronic component, which can suppress the occurrence of LC failure and has a simple manufacturing process.

DETAILED DESCRIPTION OF THE PREFERRED EMBODIMENTS

Hereinafter, a method for manufacturing an electronic component according to the present disclosure will be described.

The present invention is not limited to the following preferred embodiments, and may be suitably modified without departing from the gist of the present invention. Combinations of two or more preferred features described in the following preferred embodiments are also within the scope of the present invention.

First, an electrolytic capacitor as an example of an object to be manufactured by the method for manufacturing an electronic component according to the present disclosure will be described.

In this case, the electronic component body constituting the electronic component is a resin molded body that include a stack including a capacitor element and a sealing resin for sealing a periphery of the stack, the capacitor element includes an anode having a valve-action metal substrate with a dielectric layer formed thereon and a cathode facing the anode, and the anode and the cathode are each preferably the internal electrode.

Figure 1:
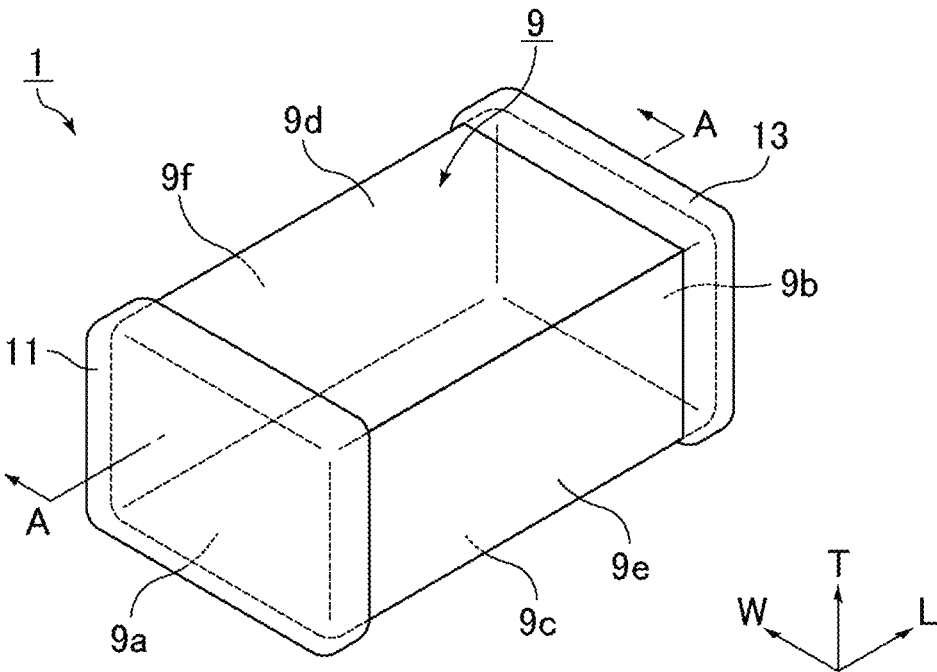
FIG. 1 is a schematic perspective view of an example of an electrolytic capacitor.

FIG. 1 is a schematic perspective view of an example of an electrolytic capacitor.

FIG. 1 shows a resin molded body 9 of an electrolytic capacitor 1.

The shape of the resin molded body constituting the electrolytic capacitor is not limited, and any three-dimensional shape can be used. The resin molded body preferably has a cuboid shape. Further, the cuboid shape is not a word meaning a complete cuboid, and a surface forming the resin molded body may have a taper without being orthogonal to other surfaces, or may have a shape with chamfered corners.

FIG. 1 shows a cuboid resin molded body 9.

The resin molded body 9 has a length direction (L direction), a width direction (W direction), and a thickness direction (T direction). The resin molded body 9 includes outer surfaces: a first end surface 9a and a second end surface 9b which are opposite to each other in the length direction. An anode external electrode 11 is formed on the first end surface 9a, and a cathode external electrode 13 is formed on the second end surface 9b.

The resin molded body 9 also includes a bottom surface 9c and a top surface 9d which are opposite to each other in the thickness direction, and a first side surface 9e and a second side surface 9f which are opposite to each other in the width direction.

The resin molded body corresponds to an electronic component body in the method for manufacturing an electronic component of the present description.

Herein, a plane along the length direction (L direction) and the thickness direction (T direction) of the electrolytic capacitor or the resin molded body is referred to as an "LT plane", a plane along the length direction (L direction) and the width direction (W direction) is referred to as an "LW plane", and a plane along the width direction (W direction) and the thickness direction (T direction) is referred to as a "WT plane".

In the following description, as for the outer surfaces of the resin molded body, a plane on which the anode external electrode is provided is referred to as a "first end surface", and a plane on which the cathode external electrode is provided is referred to as a "second end surface". In the outer surfaces of the resin molded body, the surface on which the anode external electrode is provided may be the same as the surface on which the cathode external electrode is provided.

Figure 2:
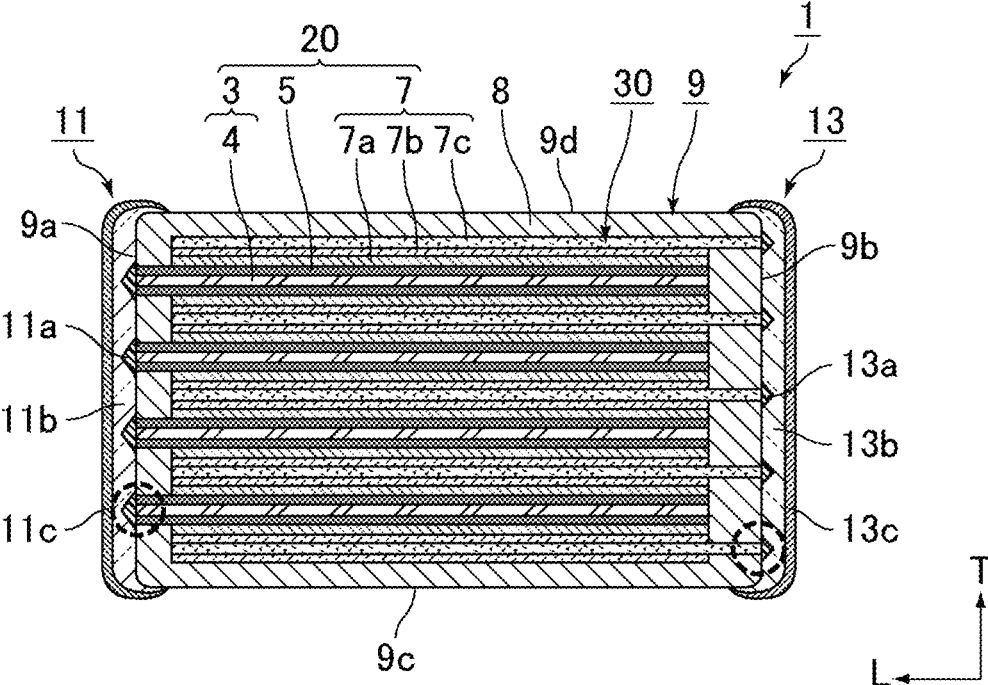
FIG. 2 is a cross-sectional view taken along line A-A of the electrolytic capacitor shown in FIG. 1.

FIG. 2 is a cross-sectional view taken along line A-A of the electrolytic capacitor shown in FIG. 1.

A capacitor element 20 includes an anode 3 having a dielectric layer 5 on a surface thereof and a cathode 7 opposite to the anode 3.

Multiple such capacitor elements 20 are stacked to form a stack 30, and the stack 30 is sealed in a sealing resin 8 to obtain the resin molded body 9. In the stack 30, the stacked capacitor elements 20 may be bonded to each other via a conductive adhesive (not shown). The number of capacitor element 20 included in the stack 30 may be one.

The anode external electrode 11 is formed on the first end surface 9a of the resin molded body 9, and the anode external electrode 11 is electrically connected to the anode 3 exposed on the first end surface 9a.

The cathode external electrode 13 is formed on the second end surface 9b of the resin molded body 9, and the cathode external electrode 13 is electrically connected to the cathode 7 exposed on the second end surface 9b.

A second end surface 9b-side end of a valve-action metal substrate 4 of the capacitor element 20 is sealed with the sealing resin 8, and the valve-action metal substrate 4 is not in direct contact with a solid electrolyte layer 7a or a conductive layer 7b. When the second end surface 9b-side end of the valve-action metal substrate 4 is insulated, for example, by being covered with the dielectric layer 5, the second end surface 9b-side end of the valve-action metal substrate 4 may be covered with the solid electrolyte layer 7a and the conductive layer 7b.

Figure 3:
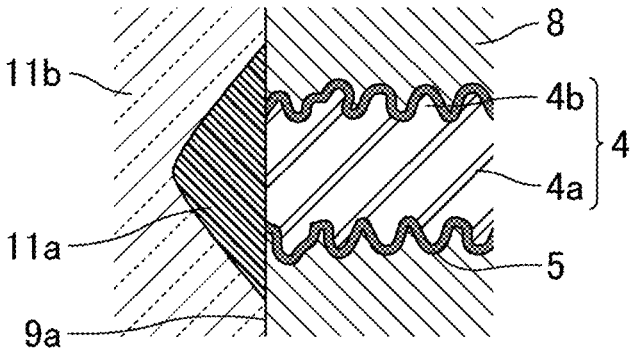
FIG. 3 is a schematic cross-sectional view showing the vicinity of a valve-action metal substrate on a first end surface of a resin molded body.

FIG. 3 is a schematic cross-sectional view showing the vicinity of a valve-action metal substrate on a first end surface of a resin molded body.

FIG. 3 is also a schematic cross-sectional view showing a region surrounded by a dotted line in a lower left portion of FIG. 2.

The valve-action metal substrate 4 has a core 4a and a porous portion 4b formed along the surface of the core 4a. An end of the valve-action metal substrate 4 is exposed on the first end surface 9a of the resin molded body 9.

The dielectric layer 5 is formed on the surface of the porous portion 4b.

Examples of the valve-action metal constituting the valve-action metal substrate include elemental metals such as aluminum, tantalum, niobium, titanium, zirconium, magnesium, and silicon, and alloys containing these metals. Of these, aluminum and an aluminum alloy are preferred.

The valve-action metal substrate may have any shape, but it is preferably flat, and is more preferably in the form of foil. Preferably, the porous portion is an etched layer that has been etched with hydrochloric acid or the like.

The thickness of the valve-action metal substrate before etching is preferably 60 μm to 180 μm. The thickness of the non-etched valve-action metal substrate (core) after etching is preferably 10 μm to 70 μm. The thickness of the porous portion is designed according to the withstand voltage and capacitance required for the electrolytic capacitor, but the thickness of the porous portion including the porous portions on both sides of the valve-action metal substrate is preferably 10 μm to 120 μm.

Preferably, the dielectric layer is formed of an oxide film of the valve-action metal. For example, when aluminum foil is used as a valve-action metal substrate, the aluminum foil is anodized in an aqueous solution containing boric acid, phosphoric acid, adipic acid, a sodium salt or an ammonium salt thereof, or the like, whereby an oxide film that serves as a dielectric layer can be formed.

The dielectric layer is formed along the surface of the porous portion, whereby pores (recesses) are formed in the dielectric layer. The thickness of the dielectric layer is designed according to the withstand voltage and capacitance required for the electrolytic capacitor, but the thickness of the dielectric layer is preferably 3 nm to 200 nm.

The anode external electrode 11 is provided on the first end surface 9a of the resin molded body 9.

The anode external electrode 11 includes a first electrode layer 11a in direct contact with the core 4a of the valve-action metal substrate 4. The first electrode layer 11a is formed by the first electrode layer forming step in the method for manufacturing an electronic component according to the present disclosure.

Preferably, the first electrode layer has a wedge-shaped cross section, in a cross-section being orthogonal to each of the outer surface of the resin molded body (first end surface of the resin molded body) and a main surface of the valve-action metal substrate, and including the first electrode layer. FIG. 3 shows that the cross section of the first electrode layer 11a has a wedge shape.

The "wedge shape" herein means a shape which has a bottom in contact with the valve-action metal substrate in the cross section and in which a width orthogonal to a direction away from the bottom (height direction) gradually narrows. The shape of the top of the wedge shape is not limited, and may be sharp, rounded, or flat. The top of the wedge shape is seemed to be approximately smooth, but it may have irregularities in a microscopic view.

The first electrode layer 11a is preferably an electrode layer containing at least one selected from the group consisting of Cu, Ni, Sn, Ag, Zn, and Au. In particular, the electrode layer is preferably an electrode layer containing at least one of Cu or Ni.

The first electrode layer 11a is preferably an electrode layer formed on the first end surface 9a as the outer surface of the resin molded body 9 by the aerosol deposition method. The method of forming the first electrode layer by the aerosol deposition method will be described later.

Preferably, the anode external electrode 11 further includes a second electrode layer 11b formed on the first electrode layer 11a. A second electrode layer 11b is formed by the second electrode layer forming step in the method for manufacturing an electronic component according to the present disclosure.

The second electrode layer 11b is preferably a conductive resin electrode layer containing a conductive component and a resin component.

An outer plating layer may be formed on the surface of second electrode layer. FIG. 2 shows a third electrode layer 11c as an outer plating layer provided on the surface of the second electrode layer 11b.

Preferably, the third electrode layer is a Ni plating layer or a Sn plating layer.

When the third electrode layer includes two layers, the third electrode layer may include a first outer plating layer formed on the surface of the second electrode layer and a second outer plating layer formed on the surface of the first outer plating layer.

Preferably, the first outer plating layer is a Ni plating layer and the second outer plating layer is a Sn plating layer.

The configuration related to the anode 3 has been described so far, and subsequently, the configuration related to the cathode 7 and other configurations constituting the resin molded body will be described with reference to FIG. 2.

The cathode 7 of the capacitor element 20 is a stack including the solid electrolyte layer 7a on the dielectric layer 5, the conductive layer 7b on the solid electrolyte layer 7a, and a cathode lead-out layer 7c on the conductive layer 7b.

The electrolytic capacitor including a solid electrolyte layer as part of the cathode can be considered to be a solid electrolytic capacitor.

Examples of materials defining the solid electrolyte layer include conductive polymers having a skeleton of pyrrole, thiophene, aniline, or the like. A conductive polymer having a thiophene skeleton is, for example, poly(3,4-ethylenedi-oxythiophene) (PEDOT), or may be PEDOT:PSS which is a complex with a dopant (poly(styrene sulfonate) (PSS)).

The solid electrolyte layer is formed by, for example, a method in which a polymerized film of poly(3,4-ethylene-dioxythiophene) or the like is formed on a surface of the dielectric layer using a treatment liquid containing a mono-mer such as 3,4-ethylenedioxythiophene or a method in which a dispersion of a polymer such as poly(3,4-ethylene-dioxythiophene) is applied to a surface of the dielectric layer and dried. Preferably, a solid electrolyte layer for an inner layer for filling the pores (recesses) is formed first, and then a solid electrolyte layer for an outer layer for covering the entire dielectric layer is formed.

The solid electrolyte layer can be formed in a predeter-mined region by applying the treatment liquid or dispersion to the dielectric layer by, for example, sponge transfer, screen printing, spray coating, dispensing, or inkjet printing. The thickness of the solid electrolyte layer is preferably 2 μm to 20 μm.

The conductive layer is provided to electrically and mechanically connect the solid electrolyte layer to the cathode lead-out layer. For example, the conductive layer is preferably a carbon layer, a graphene layer, a silver layer, a copper layer, or a nickel layer formed by applying a con-ductive paste such as a carbon paste, a graphene paste, a silver paste, a copper paste, or a nickel paste. Further, the conductive layer may be, for example, a composite layer in which a silver layer, a copper layer, or a nickel layer is provided on a carbon layer or a graphene layer, or may be a mixed layer formed by applying a paste mixture in which a carbon paste or a graphene paste is mixed with a silver paste, a copper paste, or a nickel paste.

The conductive layer can be formed on the solid electro-lyte layer by applying a conductive paste such as a carbon paste by, for example, sponge transfer, screen printing, spray coating, dispensing, or inkjet printing. Preferably, a cathode lead-out layer formed in a subsequent step is stacked while the conductive layer is viscous before drying. The thickness of the conductive layer is preferably 2 μm to 20 μm.

The cathode lead-out layer can be formed from a metal foil.

In the case of the metal foil, the metal foil preferably contains at least one metal selected from the group consist-ing of Al, Cu, Ag, and an alloy mainly containing any of these metals. When the metal foil contains any of these metals, the metal foil can have a lower resistance value, and the equivalent series resistance (ESR) can be reduced.

Alternatively, the metal foil may be one whose surface is coated with carbon or titanium by a film forming method such as sputtering or vapor deposition. Use of carbon-coated Al foil is more preferred. The thickness of the metal foil is not limited, but it is preferably 20 μm to 50 μm, in view of better handling during production, smaller size, and lower ESR.

Figure 4:
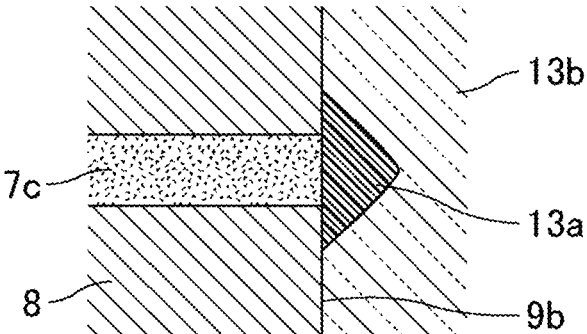
FIG. 4 is a schematic cross-sectional view showing the vicinity of a cathode lead-out layer on a second end surface of the resin molded body.

FIG. 4 is a schematic cross-sectional view showing the vicinity of a cathode lead-out layer on a second end surface of the resin molded body.

FIG. 4 is also a schematic cross-sectional view showing a region surrounded by a dotted line in a lower right portion of FIG. 2.

The cathode lead-out layer 7c as a metal foil is exposed on the second end surface 9b of the resin molded body 9.

The cathode external electrode 13 is provided on the second end surface 9b as the outer surface of the resin molded body 9.

The cathode external electrode 13 may include a first electrode layer 13a that is in direct contact with the cathode lead-out layer 7c. It is possible to use the first electrode layer 13a having the same configuration as the first electrode layer 11a formed on the first end surface 9a of the resin molded body 9.

Preferably, the first electrode layer has a wedge-shaped cross section, in a cross-section being orthogonal to each of the outer surface of the resin molded body (second end surface of the resin molded body) and a main surface of the cathode lead-out layer, and including the first electrode layer. FIG. 4 shows that the cross section of the first electrode layer 13a has a wedge shape.

Similarly to the anode external electrode 11, the cathode external electrode 13 may include a second electrode layer 13b formed on the first electrode layer 13a, or may include a third electrode layer 13c.

As the configurations of the second electrode layer 13b and the third electrode layer 13c, configurations similar to the configurations of the second electrode layer 11b and the third electrode layer 11c in the anode external electrode 11 can be used.

The sealing resin 8 defining the resin molded body 9 contains at least a resin, and preferably contains a resin and a filler. Preferably, examples of the resin include insulating resins, such as epoxy resins, phenolic resins, polyimide resins, silicone resins, polyamide resins, and liquid crystal polymers. The resin molded body 9 may include two or more kinds of insulating resins. The sealing resin 8 can be used in the form of either a solid resin or a liquid resin. Preferably, examples of the filler include inorganic particles such as silica particles, alumina particles, and metal particles. Use of a material obtained by adding silica particles to a solid epoxy resin and/or a phenolic resin is more preferred.

When a solid sealing material is used, preferably, the molding method of the resin molded body uses a resin mold such as a compression mold or a transfer mold. Use of a compression mold is more preferred. When a liquid sealing material is used, use of a molding method such as dispensing or printing is preferred. Preferably, a compression mold is used to seal the stack 30 of the capacitor elements 20 each including the anode 3, the dielectric layer 5, and the cathode 7 in the sealing resin 8 to obtain the resin molded body 9.

Next, a method for manufacturing an electronic component according to the present disclosure will be described by exemplifying the case of manufacturing such an electrolytic capacitor.

In the method for manufacturing an electronic component according to the present disclosure, prepared is an electronic component body including an internal electrode, in which the internal electrode is exposed on an outer surface. In the electrolytic capacitor shown in FIG. 2, the resin molded body 9 corresponds to an electronic component body.

Hereinafter, a mode in which the anode is exposed on the outer surface of the resin molded body as the electronic component body, and the first electrode layer forming step is performed on the outer surface of the resin molded body on which the anode is exposed will be described as an example in which the outer surface of the resin molded body on which the anode is exposed is assumed as the first end surface.

Figure 5:
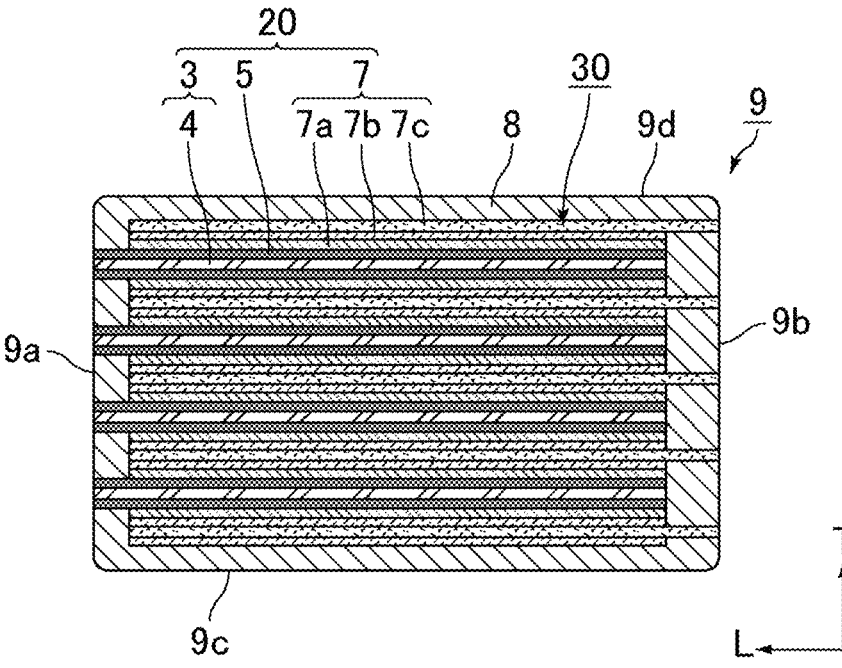
FIG. 5 is a schematic cross-sectional view showing an example of the resin molded body.

FIG. 5 is a schematic cross-sectional view showing an example of the resin molded body.

In the first electrode layer forming step, the first electrode layer is formed by injecting fine metal particles to the first end surface as the outer surface of the electronic component body and causing the fine metal particles to collide with the first end surface at a pressure lower than atmospheric pressure.

When the first electrode layer is formed by this step, an external electrode can be formed without using a plating process which is likely to corrode the internal electrode, and thus LC failure due to a plating solution can be suppressed.

The method for forming the first electrode layer is preferably an aerosol deposition method, a gas deposition method, or the like. In particular, the first electrode layer is preferably formed on the outer surface of the electronic component body by an aerosol deposition method.

Figure 6:
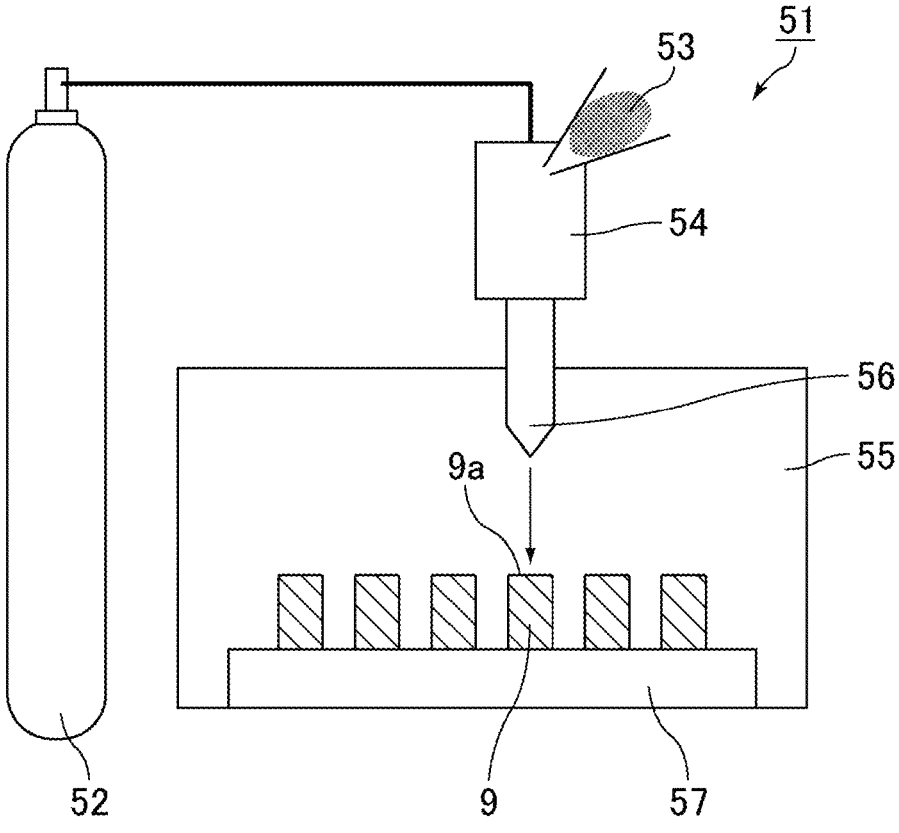
FIG. 6 is a schematic view showing a step of forming a first electrode layer by an aerosol deposition method.

FIG. 6 is a schematic view showing a step of forming the first electrode layer by an aerosol deposition method.

FIG. 6 shows an aerosol deposition device 51. The aerosol deposition device 51 includes a cylinder containing a carrier gas 52, an aerosol generator 54 for generating aerosol into which the carrier gas 52 and fine metal particles 53 are introduced, a chamber 55 into which aerosol is introduced, and a stage 57 on which the electronic component bodies 9 are arranged and fixed with the first end surfaces 9a facing upward.

In the aerosol deposition method, the fine metal particles 53 are injected from a nozzle 56 provided at the tip of the aerosol generator 54 and collide with the first end surface 9a of the electronic component body 9 to form the first electrode layer.

When the first electrode layer is formed by the aerosol deposition method, the thickness of the first electrode layer can be reduced, and the bonding strength between electronic component body and the first electrode layer can be increased. Furthermore, according to the aerosol deposition method, the film formation can be performed at a low speed and a low temperature, thereby enabling damage to the electronic component body to be reduced.

The first electrode layer forming step is performed at a pressure lower than atmospheric pressure. By vacuuming the inside of the chamber, the inside of the chamber can be brought to a pressure lower than the atmospheric pressure. The pressure in the chamber is preferably 10 Pa to 1000 Pa.

The pressure in the chamber can be adjusted by increasing or decreasing the gas flow rate. In a case where the gas flow rate is increased such that the pressure in the chamber is, for example, 100 Pa or more, the film formation speed can be increased. As a result, the film formation cost can be reduced.

The first electrode layer forming step is preferably performed at 100° C. or lower, and is more preferably performed at ambient temperature. Since it is not necessary to increase the temperature, damage to the electronic component body can be reduced, and the aerosol deposition device can be simplified by performing at ambient temperature.

The ambient temperature may be any temperature as long as it is a temperature in a working environment, and may be, for example, 10° C. or higher and 30° C. or lower.

The fine metal particles are preferably fine particles containing at least one selected from the group consisting of Cu, Ni, Sn, Ag, Zn, and Au, more preferably fine particles containing at least one of Cu or Ni.

By changing the particle size of the fine metal particles, the scanning speed of the nozzle, and the injection amount of the fine metal particles per unit time, the ease of adhesion of the fine metal particles and the thickness of the first electrode layer can be adjusted.

From the viewpoint of the ease of adhesion of the metal fine particles and the thickness of the first electrode layer, the particle size (D50) of the fine metal particles is preferably less than 5 μm, more preferably less than 3 μm.

The D50 of the fine metal particles is a median diameter based on the volume distribution measured by a laser diffraction/scattering method.

As a device for measuring the D50 of fine metal particles, for example, MT3300 manufactured by MicrotracBEL Corp. can be used.

In the first electrode layer forming step, preferably, a first electrode layer having a thickness of 0.1 μm to 30 μm is formed. More preferably, a first electrode layer having a thickness of 1.0 μm to 30 μm is formed. When the thickness of the first electrode layer is in the above range, the ESR of the electrolytic capacitor can be reduced, and the adhesion force between the first electrode layer and the electronic component body can also be increased.

The thickness of the first electrode layer may be measured at the thickest point in the cross-sectional photograph including the first electrode layer as shown in FIG. 3.

After the first electrode layer is formed, a second electrode layer forming step of forming a second electrode layer containing a conductive component and a resin component on the first electrode layer may be performed.

In the second electrode layer forming step, a printed resin electrode layer as the second electrode layer is preferably formed by performing screen printing of the electrode paste.

When the second electrode layer is formed by screen printing of the electrode paste, the external electrodes can be made flat, as compared to the case where the second electrode layer is formed by dipping in an electrode paste. In other words, the external electrode has better thickness uniformity.

Preferably, the conductive component mainly includes a component such as Ag, Cu, Ni, or Sn, and the resin component mainly includes an epoxy resin, a phenolic resin, or the like.

In particular, a conductive resin electrode layer containing Ag is preferably formed as the second electrode layer. The conductive resin electrode layer containing Ag can reduce ESR owing to the low specific resistance of Ag.

The electrode paste may contain an organic solvent, and the organic solvent is preferably a glycol ether-based solvent. Examples include diethylene glycol monobutyl ether and diethylene glycol monophenyl ether.

The electrode paste may also contain an additive, if necessary. The additive is effective in adjusting the rheology, especially thixotropy, of the electrode paste. The amount of the additive contained is preferably less than 5 wt % relative to the weight of the electrode paste.

After the second electrode layer is formed, a third electrode layer forming step of forming a third electrode layer on the second electrode layer by plating may be performed.

In a case where the first electrode layer is formed in advance on the electronic component body, LC failure is less likely to occur even after the third electrode layer is formed by plating.

Alternatively, a third electrode layer forming step of forming a third electrode layer on the first electrode layer by plating may be performed without forming the second electrode layer.

In this case, when the first electrode layer is formed in advance on the electronic component body, LC failure is less likely to occur even after the third electrode layer is formed by plating.

The first electrode layer forming step may also be performed on the second end surface of the electronic component body, similarly on the first end surface of the electronic component body, to form the first electrode layer on the second end surface.

Through the step, the first electrode layer 13a as shown in FIG. 4 can be formed on the second end surface 9b of the electronic component body.

Thereafter, the second electrode layer 13b and the third electrode layer 13c can be formed, similarly on the first end surface of the electronic component body.

In particular, when the cathode lead-out layer is a metal foil, providing the first electrode layer by the first electrode layer forming step is effective because the adhesion force between the metal foil and the first electrode layer can be improved.

The method for manufacturing an electronic component according to the present disclosure can be used in a method for manufacturing the above-described electrolytic capacitor as an electronic component, but can also be used in a method for manufacturing an electrolytic capacitor in another form and a method for manufacturing a multilayer ceramic electronic component. These examples will be described below.

Figure 7:
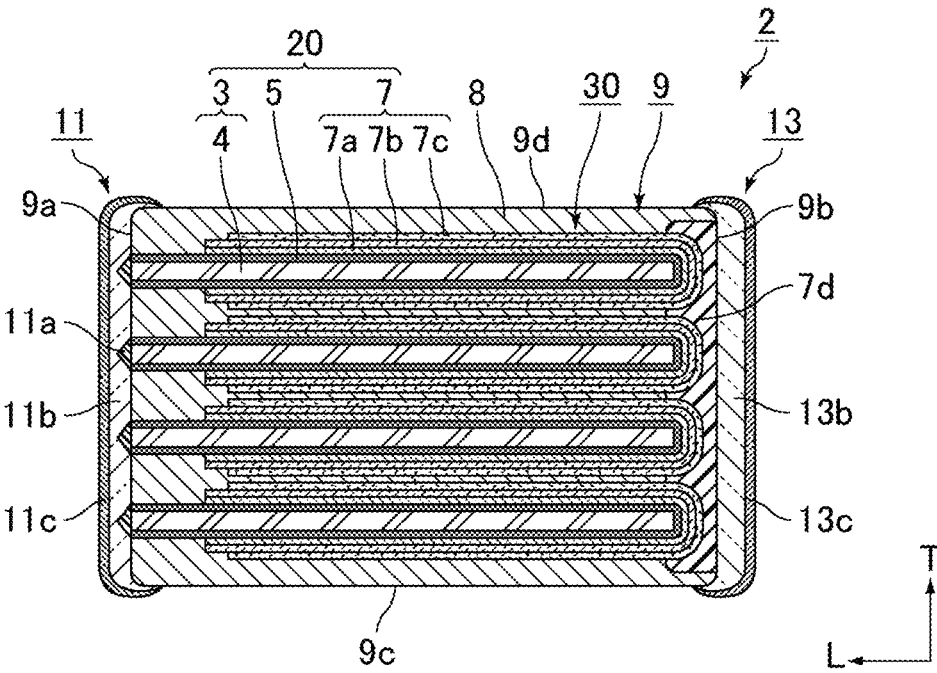
FIG. 7 is a schematic cross-sectional view of another example of the electrolytic capacitor.

FIG. 7 is a schematic cross-sectional view of another example of the electrolytic capacitor.

In the electrolytic capacitor 2 shown in FIG. 7, the cathode lead-out layer 7c and the cathode lead-out portion 7d are formed from an electrode paste instead of a metal foil.

In this case, the cathode lead-out layer can be formed in a predetermined region by applying an electrode paste to the conductive layer by, for example, sponge transfer, screen printing, spray coating, dispensing, or inkjet printing. The electrode paste is preferably one mainly containing Ag, Cu, or Ni. The cathode lead-out layer formed from an electrode paste can make the cathode lead-out layer thinner than the cathode lead-out layer formed from metal foil. In the case of screen printing, the cathode lead-out layer can have a thickness of 2 μm to 20 μm.

When the cathode lead-out layer 7c and the cathode lead-out portion 7d are formed from an electrode paste, the second electrode layer 13b can be formed by screen printing of the electrode paste without providing the first electrode layer on the cathode side.

The cathode lead-out layer 7c of each of the capacitor elements 20 is collected as the cathode lead-out portion 7d near the second end surface 9b and exposed on the second end surface 9b.

The cathode lead-out portion 7d can also be formed from the same electrode paste as the cathode lead-out layer 7c. The electrode pastes respectively constituting the cathode lead-out portion 7d and the cathode lead-out layer 7c may have different compositions.

When the cathode lead-out layer 7c and the cathode lead-out portion 7d are formed from an electrode paste, the adhesion force to the second electrode layer 13b formed by screen printing of the electrode paste is improved.

Although not shown in FIG. 7, an insulating mask may be provided on the anode side. In that case, the insulating mask may be provided on the surface of the dielectric layer.

In another example of the electrolytic capacitor shown in FIG. 7, the solid electrolyte layer may be formed in a predetermined region by applying the treatment liquid or dispersion described above onto the dielectric layer by dipping. Similarly, the conductive layer may be formed by applying a conductive paste such as a carbon paste onto the solid electrolyte layer by dipping.

The first electrode layer forming step is similarly performed on the first end surface of the electronic component body as shown in FIG. 7 to form a first electrode layer.

Further, a second electrode layer forming step and a third electrode layer forming step may be performed.

In the method for manufacturing an electronic component of the present disclosure, the configuration may be such that the electronic component body is a cuboid stack formed by stacking at least one ceramic layer selected from the group consisting of a dielectric ceramic layer, a magnetic ceramic layer, a piezoelectric ceramic layer, and a semiconductor ceramic layer; and an internal electrode layer, and the internal electrode layer is the internal electrode. In this configuration, the electronic component is a multilayer ceramic electronic component.

Examples of the multilayer ceramic electronic component include multilayer ceramic capacitors, multilayer coils, multilayer thermistors, multilayer varistors, multilayer LC filters, and multilayer piezoelectric filters. Hereinafter, a multilayer ceramic capacitor as an example of the multilayer ceramic electronic component will be described.

Figure 8:
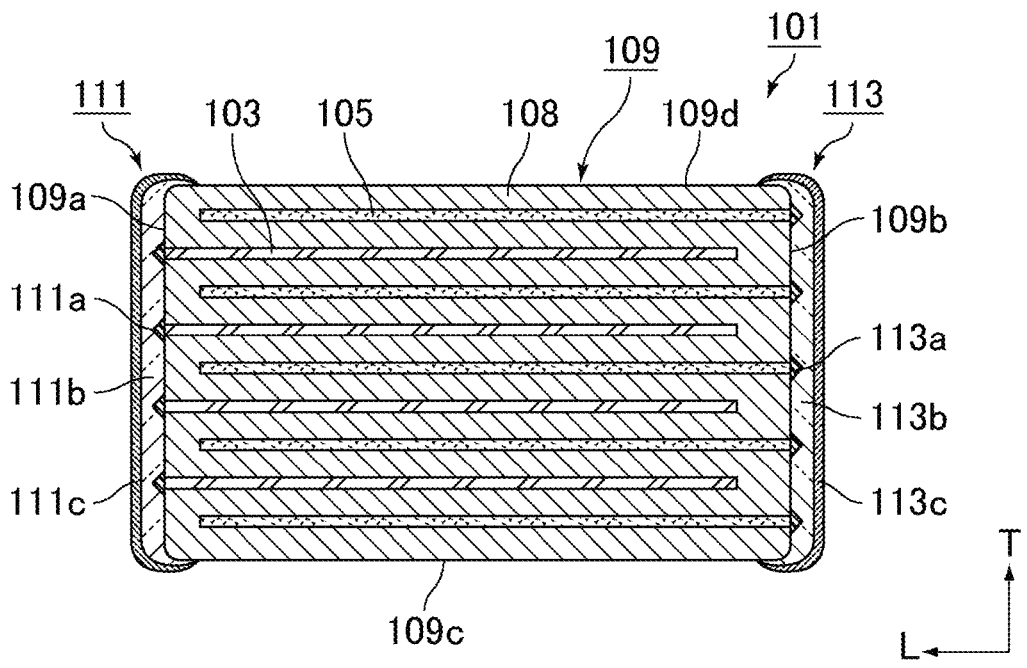
FIG. 8 is a schematic cross-sectional view showing an example of a multilayer ceramic electronic component.

FIG. 8 is a schematic cross-sectional view showing an example of the multilayer ceramic electronic component.

A multilayer ceramic capacitor 101 includes a stack 109 in which dielectric ceramic layers 108, internal electrode layers 103, and internal electrode layers 105 are stacked.

The stack 109 corresponds to an electronic component body.

The shape of the stack constituting the multilayer ceramic electronic component is not limited, and any three-dimensional shape can be used. The stack preferably has a cuboid shape. Further, the cuboid shape is not a word meaning a complete cuboid, and a surface forming the stack may have a taper without being orthogonal to other surfaces, or may have a shape with chamfered corners.

FIG. 8 shows a cuboid stack 109.

The stack 109 has outer surfaces: a first end surface 109a, a second end surface 109b, a bottom surface 109c, and a top surface 109d as well as a first side surface and a second side surface (not shown).

The dielectric ceramic layers constituting the stack include a dielectric ceramic such as barium titanate. Each of the dielectric ceramic layers can be obtained by forming a sheet of dielectric slurry containing a dielectric ceramic and an organic solvent.

The internal electrode layers constituting the stack can be obtained by printing an electrode paste containing a conductive component. Each of the internal electrode layers is preferably a Ni electrode layer using Ni as a conductive component.

Instead of the Ni electrode layer, a Ag electrode layer, a Pd electrode layer, or a Cu electrode layer may be used.

A first electrode layer 111a connected to an internal electrode layer 103 as an internal electrode can be formed by performing the first electrode layer forming step on the first end surface 109a of the stack 109 as shown in FIG. 8.

Further, a first electrode layer 113a connected to an internal electrode layer 105 as an internal electrode may be formed by performing the first electrode layer forming step on the second end surface 109b of the stack 109.

In addition to the first electrode layers 111a and 113a, a second electrode layer 111b, a second electrode layer 113b, a third electrode layer 111c, and a third electrode layer 113c may be further formed. Through these steps, an anode external electrode 111 and a cathode external electrode 113 are formed.

Further, the third electrode layer 111c and the third electrode layer 113c may be formed on the first electrode layer 111a and the first electrode layer 113a, respectively, without forming the second electrode layer 111b and the second electrode layer 113b.

EXAMPLES

The following shows examples of the electrolytic capacitor as the electronic component of the present disclosure in which the LC failure, adhesion strength, and ESR were evaluated. The present invention is not limited to these examples.

Examples 1 to 8

A stack having a configuration shown in FIG. 1 and FIG. 2 was sealed in a sealing resin containing an epoxy resin and silica particles to obtain a resin molded body.

A first electrode layer was formed on a first end surface of the resin molded body by an aerosol deposition method (AD method). Cu particles were used as the fine metal particles, and the thickness of the first electrode layer was changed by changing film formation conditions in the aerosol deposition method.

The type (metal type) of the fine metal particles and the thickness of the first electrode layer in each of the Examples are shown in Table 1.

A first electrode layer was also formed on a second end surface of the resin molded body, similarly on the first end surface.

Thereafter, a Ag-containing electrode paste was applied to the end surfaces (the first end surface and the second end surface) of the resin molded body by screen printing, and was thermally cured. Thus, second electrode layers were formed. Further, a Ni plating layer and a Sn plating layer as third electrode layers were formed on a surface of each of the second electrode layers to prepare an electrolytic capacitor.

Comparative Example 1

A zincate treatment was performed in which first and second end surfaces of the resin molded body were etched with an acid containing nitric acid as a main component, and a zinc film was formed. Ni plating and Ag plating were performed to form a first electrode layer.

A second electrode layer and a third electrode layer were formed in the same manner as in Example 1, and thus an electrolytic capacitor was produced.

The thickness of each of the Ni plating layer and the Ag plating layer was 5 μm.

[Measurement of Film Thickness]

The thickness of the first electrode layer of the electrolytic capacitor was measured nondestructively by a fluorescent X-ray coating thickness gauge (SFT9450, manufactured by Hitachi High-Tech Science Corporation). The thickness obtained by this measurement method is about a half of the physical film thickness measured by polishing the cross section of the LT plane of the electrolytic capacitor and using SEM/EDS. Therefore, the thickness twice the thickness measured by the fluorescent X-ray coating thickness gauge is regarded as the thickness of the first electrode layer, and is shown in Table 1.

[Measurement of LC Failure]

The proportion of occurrence of LC failure, i.e. LC failure rate (%), was determined for each of 1000 electrolytic capacitors according to each of the Examples or Comparative Example.

[Measurement of Adhesion Strength]

Each of the electrolytic capacitors was mounted on a glass epoxy substrate, and the glass epoxy substrate was bent at 1 mm/sec until the displacement reached 10 mm, and held for 5 seconds. Then, the change rate in capacitance was measured.

When the bonding strength between the first electrode layer and the second electrode layer is weak, the capacitor element and the external electrode are opened by peeling, and the capacitance is changed. Therefore, the measurement of the change rate in capacitance can be substituted for the measurement of the adhesion strength between the first electrode layer and the second electrode layer.

As evaluation criteria, a change rate in capacitance of 5% or less was rated as "excellent", a change rate in capacitance of more than 5% and 10% or less was rated as "good", and a change rate in capacitance of more than 10% was rated as "poor".

[Measurement of ESR]

The ESR (mΩ) at 100 kHz was measured with an LCR meter (E4980A available from KEYSIGHT). The ESR was measured as an average value of the results of measuring 10 electrolytic capacitors.

As evaluation criteria, a capacitor having an ESR of 30 mΩ or less was rated as "excellent", a capacitor having an ESR of more than 30 mΩ and 40 mΩ or less was rated as "good", and a capacitor having an ESR of more than 40 mΩ was rated as "fair" (practically acceptable).

The results of these evaluation tests are shown in Table 1.

TABLE 1

| | Method of forming first electrode layer | Metal type | First electrode layer thickness | LC failure rate | Adhesion Strength | ESR |
|---|---|---|---|---|---|---|
| Example 1 | AD method | Cu | 0.1 μm | 0.8% | Excellent | Good |
| Example 2 | AD method | Cu | 0.2 μm | 0.9% | Excellent | Good |
| Example 3 | AD method | Cu | 1.0 μm | 0.8% | Excellent | Excellent |
| Example 4 | AD method | Cu | 5.0 μm | 1.0% | Excellent | Excellent |

TABLE 1-continued

| | Method of forming first electrode layer | Metal type | First electrode layer thickness | LC failure rate | Adhesion Strength | ESR |
|---|---|---|---|---|---|---|
| Example 5 | AD method | Cu | 10 μm | 0.9% | Excellent | Excellent |
| Example 6 | AD method | Cu | 20 μm | 1.0% | Excellent | Excellent |
| Example 7 | AD method | Cu | 25 μm | 1.1% | Excellent | Excellent |
| Example 8 | AD method | Cu | 30 μm | 0.8% | Excellent | Excellent |
| Comparative | Plating | Ni/Ag | 5 μm/5 μm | 8.3% | Excellent | Fair |

In each of the Examples in which the first electrode layer was formed by the AD method, the LC failure was small. However, in Comparative Example 1 in which the first electrode layer was formed by plating, the LC failure was large.

When the thickness of the first electrode layer was as thin as 0.2 μm or less, the ESR was slightly high. This is considered to be because the formation of the first electrode layer on the valve-action metal substrate is partially insufficient.

REFERENCE SIGNS LIST 1, 2 electrolytic capacitor (electronic component)
3 anode
4 valve-action metal substrate
4a core
4b porous portion
5 dielectric layer
7 cathode
7a solid electrolyte layer
7b conductive layer
7c cathode lead-out layer
7d cathode lead-out portion
8 sealing resin
9 resin molded body (electronic component body)
9a first end surface of resin molded body (outer surface of resin molded body)
9b second end surface of resin molded body (outer surface of resin molded body)
9c bottom surface of resin molded body (outer surface of resin molded body)
9d top surface of resin molded body (outer surface of resin molded body)
9e first side surface of resin molded body (outer surface of resin molded body)
9f second side surface of resin molded body (outer surface of resin molded body)
11 anode external electrode
11a, 13a first electrode layer
11b, 13b second electrode layer
11c, 13c third electrode layer
13 cathode external electrode
20 capacitor element
30 stack
51 aerosol deposition device
52 carrier gas
53 fine metal particles
54 aerosol generator
55 chamber
56 nozzle
57 stage
101 multilayer ceramic capacitor (electronic component)
103, 105 internal electrode layer
108 dielectric ceramic layer
109 stack (electronic component body)
109a first end surface of stack
109b second end surface of stack
109c bottom surface of stack
109d top surface of stack
111 anode external electrode
111a, 113a first electrode layer
111b, 113b second electrode layer
111c, 113c third electrode layer
113 cathode external electrode

The invention claimed is:

1. A method for manufacturing an electronic component, the method comprising:
  preparing an electronic component body having an internal electrode, the internal electrode being exposed on an outer surface of the electronic component body; and
  forming a first electrode layer by injecting fine metal particles to the outer surface of the electronic component body and causing the fine metal particles to collide with the outer surface at a pressure lower than atmospheric pressure.

2. The method for manufacturing an electronic component according to claim 1, wherein the first electrode layer is formed by an aerosol deposition method.

3. The method for manufacturing an electronic component according to claim 1, wherein the first electrode layer is formed to have a wedge-shaped cross section.

4. The method for manufacturing an electronic component according to claim 1, wherein the first electrode layer contains at least one selected from the group consisting of Cu, Ni, Sn, Ag, Zn, and Au.

5. The method for manufacturing an electronic component according to claim 1, wherein the first electrode layer is formed at a temperature of 100° C. or lower.

6. The method for manufacturing an electronic component according to claim 5, wherein the first electrode layer is formed at ambient temperature.

7. The method for manufacturing an electronic component according to claim 1, wherein the fine metal particles have a D50 of less than 5 μm.

8. The method for manufacturing an electronic component according to claim 7, wherein the D50 of the fine metal particles is less than 3 μm.

9. The method for manufacturing an electronic component according to claim 1, wherein the first electrode layer is formed to have a thickness of 0.1 μm to 30 μm is formed.

10. The method for manufacturing an electronic component according to claim 9, wherein the first electrode layer is formed to have a thickness of 1.0 μm to 30 μm.

11. The method for manufacturing an electronic component according to claim 1, further comprising forming a second electrode layer containing a conductive component and a resin component on the first electrode layer.

12. The method for manufacturing an electronic component according to claim 11, further comprising forming a third electrode layer on the second electrode layer by plating.

13. The method for manufacturing an electronic component according to claim 11, wherein the second electrode layer is formed by screen printing of an electrode paste.

14. The method for manufacturing an electronic component according to claim 1, further comprising forming a second electrode layer on the first electrode layer by plating.

15. The method for manufacturing an electronic component according to claim 1, wherein the electronic component body is a resin molded body that includes a stack including a capacitor element and a sealing resin for sealing a periphery of the stack, the capacitor element includes an anode having a valve-action metal substrate with a dielectric layer formed thereon and a cathode facing the anode, and the anode and the cathode are each the internal electrode.

16. The method for manufacturing an electronic component according to claim 15, wherein the anode is exposed on the outer surface of the resin molded body, and the first electrode layer forming step is performed on the outer surface of the resin molded body on which the anode is exposed.

17. The method for manufacturing an electronic component according to claim 1, wherein the electronic component body is a cuboid stack formed by stacking at least one ceramic layer and an internal electrode layer, wherein the at least one ceramic layer is selected from the group consisting of a dielectric ceramic layer, a magnetic ceramic layer, a piezoelectric ceramic layer, and a semiconductor ceramic layer; and wherein the internal electrode layer is the internal electrode.

18. The method for manufacturing an electronic component according to claim 1, wherein the pressure lower than atmospheric pressure is 10 Pa to 1000 Pa.

* * * * *